US012617593B2

(12) United States Patent
Oh et al.

(10) Patent No.: US 12,617,593 B2
(45) Date of Patent: *May 5, 2026

---

(54) BIODEGRADABLE FILM FOR CIGARETTE PACKAGING

(71) Applicant: KT&G CORPORATION, Daejeon (KR)

(72) Inventors: Kyoung Hwan Oh, Yuseong-gu (KR); Min Hee Hwang, Yuseong-gu (KR); Soo Ho Kim, Yuseong-gu (KR); Man Seok Seo, Yuseong-gu (KR)

(73) Assignee: KT&G CORPORATION, Daejeon (KR)

( * ) Notice: Subject to any disclaimer, the term of this patent is extended or adjusted under 35 U.S.C. 154(b) by 279 days.

This patent is subject to a terminal disclaimer.

(21) Appl. No.: 18/025,061

(22) PCT Filed: Dec. 16, 2022

(86) PCT No.: PCT/KR2022/020527
§ 371 (c)(1),
(2) Date: Mar. 7, 2023

(87) PCT Pub. No.: WO2023/113521
PCT Pub. Date: Jun. 22, 2023

(65) Prior Publication Data
US 2024/0286812 A1     Aug. 29, 2024

(30) Foreign Application Priority Data

Dec. 16, 2021     (KR) ........................ 10-2021-0180288
Dec. 15, 2022     (KR) ........................ 10-2022-0175881

(51) Int. Cl.
*B65D 65/46* (2006.01)
*B32B 27/08* (2006.01)
(Continued)

(52) U.S. Cl.
CPC ............ *B65D 65/466* (2013.01); *B32B 27/08* (2013.01); *B32B 27/304* (2013.01); *B32B 27/36* (2013.01);
(Continued)

(58) Field of Classification Search
CPC .............................. B32B 27/36; B32B 27/306
See application file for complete search history.

(56) References Cited

U.S. PATENT DOCUMENTS 5,427,235 A     6/1995     Powell et al.
7,235,287 B2     6/2007     Egawa
(Continued)

FOREIGN PATENT DOCUMENTS

CN     103252964 A     8/2013
CN     110370767 A     10/2019
(Continued)

OTHER PUBLICATIONS

Kolstad et al. "Assessment of anaerobic degradation of Ingeo(TM) polylactides under accelerated landfill conditions", Polymer Degradation and Stability, 97, (2012); pp. 1131-1141.*
(Continued)

*Primary Examiner* — Prashant J Khatri
(74) *Attorney, Agent, or Firm* — Sughrue Mion, PLLC

(57)     ABSTRACT

Provided is a biodegradable film for cigarette packaging, the film including a first film layer applied such that one surface thereof faces a cigarette product, a third film layer applied such that one surface thereof is exposed to the outside, and a second film layer positioned between the first film layer and the third film layer. In the biodegradable film, the first film layer, the second film layer and the third film layer are each formed with different compositions, and at least one of the first film layer, the second film layer and the third film layer includes a biodegradable material. The biodegradable
(Continued)

Direction to outside

100

30
20
10

Direction to cigarette product film has a biodegradation rate of 90% or more after 60 days, and has a heat shrink ratio of 4.0% or more.

10 Claims, 1 Drawing Sheet

(51) Int. Cl.

| | | |
|---|---|---|
| *B32B 27/30* | (2006.01) | |
| *B32B 27/36* | (2006.01) | |
| *B65D 65/42* | (2006.01) | |
| *C09D 127/08* | (2006.01) | |
| *C09D 167/04* | (2006.01) | |

(52) U.S. Cl.
CPC ........... *B65D 65/42* (2013.01); *C09D 127/08* (2013.01); *C09D 167/04* (2013.01); *B32B 2250/03* (2013.01); *B32B 2250/24* (2013.01); *B65D 2565/387* (2013.01)

(56) References Cited

U.S. PATENT DOCUMENTS

| | | | |
|---|---|---|---|
| 2008/0277297 A1 | 11/2008 | Busch et al. | |
| 2009/0311544 A1* | 12/2009 | Lee ......................... | B29C 48/08 |
| | | | 524/451 |
| 2011/0171489 A1* | 7/2011 | Dou ...................... | B29C 55/143 |
| | | | 427/250 |

| | | | |
|---|---|---|---|
| 2011/0244185 A1 | 10/2011 | Dou et al. | |
| 2011/0244186 A1 | 10/2011 | Dou et al. | |
| 2019/0315096 A1 | 10/2019 | Dhariwal et al. | |
| 2019/0359401 A1 | 11/2019 | Sebastian et al. | |

FOREIGN PATENT DOCUMENTS

| | | | |
|---|---|---|---|
| CN | 110774714 A | 2/2020 | |
| EP | 2 552 689 B1 | 10/2017 | |
| JP | 4-226344 A | 8/1992 | |
| JP | 2006-137074 A | 6/2006 | |
| JP | 2007-136770 A | 6/2007 | |
| JP | 2008-62586 A | 3/2008 | |
| JP | 2009-67011 A | 4/2009 | |
| KR | 10-2006-0081713 A | 7/2006 | |
| KR | 10-2008-0064123 A | 7/2008 | |
| KR | 10-2011-0057500 A | 6/2011 | |
| KR | 10-2012-0056023 A | 6/2012 | |
| KR | 10-1183979 B1 | 9/2012 | |
| KR | 10-2017-0044573 A | 4/2017 | |

OTHER PUBLICATIONS

Extended European Search Report dated Apr. 3, 2024, issued in European Application No. 22850698.6.
Communication dated May 21, 2024, issued in Japanese Application No. 2023-520075.
International Search Report dated Mar. 21, 2023 in International Application No. PCT/KR2022/020527.

* cited by examiner

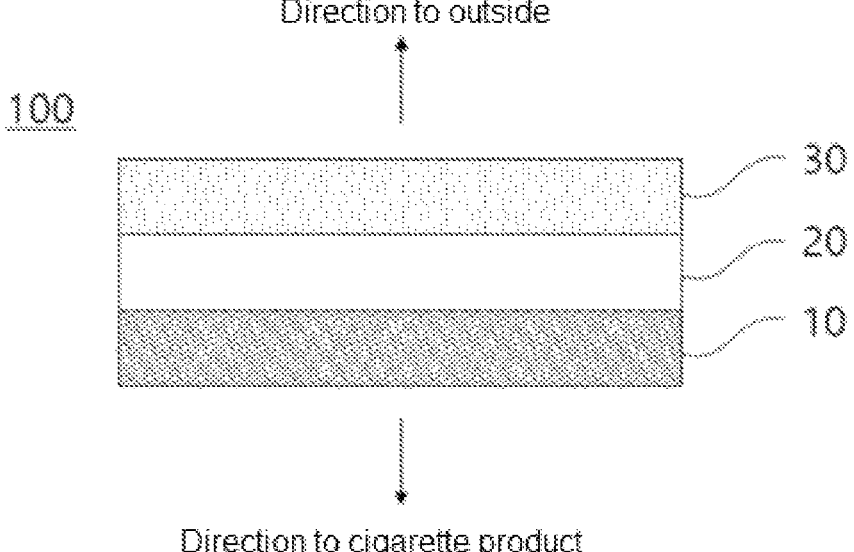

BIODEGRADABLE FILM FOR CIGARETTE PACKAGING

TECHNICAL FIELD

The present invention relates to a biodegradable film for cigarette packaging.

This application is a National Stage of International Application No. PCT/KR2022/020527 filed on Dec. 16, 2022, claiming priority based on Korean Patent Application Nos. 10-2021-0180288 filed on Dec. 16, 2021, and 10-2022-0175881 filed on Dec. 15, 2022, the entire contents of which are incorporated as a part of the present specification by reference.

BACKGROUND ART

Synthetic plastics are widely used as a packaging material requiring inexpensive and lightweight properties and the like along with excellent properties. Examples of such synthetic plastics include polyvinyl chloride (PVC), polyethylene (PE), polypropylene (PP), polyethylene terephthalate (PET) and the like. Despite their excellent properties, the synthetic plastics generate many harmful substances during manufacture or incineration, or accumulate without being hardly decomposed due to their chemical and biological stability causing environmental pollution problems. As environmental issues have recently emerged, interests in environmental-friendly biodegradable materials capable of replacing the synthetic plastics are increasing.

As materials currently used mainly for a cigarette packaging material, an open box-type paper packaging material is used as a container for containing a cigarette product, and, in order to maintain quality of the product for hydration and oxidation degradation, outside the paper packaging material is seal packaged using a film. As a currently commercialized packaging material for external sealing, an OPP film is mainly used. The OPP film is a petroleum-based plastic material and is not subject to separate dispose, and is mostly disposed as general waste. The OPP film also has environmental pollution issues in terms that it is not highly biodegradable, and studies on alternate materials having high degradability while maintaining the same functionalities as the OPP film have been actively conducted in the art.

The inventors of the present invention have recognized the technical challenges for a packaging material for external sealing of a cigarette product described above, and completed the present invention after continuous studies on materials capable of replacing the OPP film.

PRIOR ART DOCUMENT

[Patent Document]
    (Patent Document 1) Korean Laid-open Patent Publication No. 10-2011-0057500

DISCLOSURE

Technical Problem

In a biodegradable film for cigarette packaging, in order to replace an existing OPP film with a biodegradable material, the present invention is directed to providing a biodegradable film capable of enhancing workability as well as heat adhesion and barrier properties by supplementing inferior functionalities other than biodegradability of a biodegradable material.

Technical Solution

According to a first aspect of the present invention, the present invention provides a biodegradable film for cigarette packaging, the film including a first film layer applied such that one surface thereof faces a cigarette product, a third film layer applied such that one surface thereof is exposed to the outside, and a second film layer positioned between the first film layer and the third film layer.

According to one embodiment of the present invention, the first film layer, the second film layer and the third film layer are each formed with different compositions, and at least one of the first film layer, the second film layer and the third film layer includes a biodegradable material.

According to one embodiment of the present invention, the biodegradable film has a biodegradation rate of 90% or more after 60 days, and has a heat shrink ratio of 4.0% or more.

According to one embodiment of the present invention, the biodegradable film has a difference in the heat shrink ratio between a length direction and a width direction of less than 1%.

According to one embodiment of the present invention, the biodegradable film has oxygen permeability of 1000 $cc/(m^2 \cdot day \cdot atm)$ or less.

According to one embodiment of the present invention, the biodegradable film has moisture permeability of 50 $g/(m^2 \cdot day \cdot atm)$ or less.

According to one embodiment of the present invention, the biodegradable film has airtightness of 50 ml/sec or less.

According to one embodiment of the present invention, the biodegradable film has haze of 6.0% or less.

According to one embodiment of the present invention, the biodegradable material is selected from the group consisting of polylactic acid, polyhydroxyl alkanoate, starch, cellulose materials, polyvinyl alcohol, polycaprolactone, polybutylene adipate terephthalate, polyethylene succinate, polybutylene succinate, polyglycolic acid and combinations thereof.

According to one embodiment of the present invention, a layer including the most of the biodegradable material among the first film layer, the second film layer and the third film layer is the second film layer.

According to one embodiment of the present invention, the second film layer includes 80% by volume or more of the biodegradable film.

According to one embodiment of the present invention, the first film layer or the third film layer includes a biodegradable material having different properties from the second film layer.

According to one embodiment of the present invention, the first film layer or the third film layer includes a polyvinyl compound, an ethylene vinyl alcohol copolymer, an acrylic compound, a sealant compound, an OP coating compound, a urethane compound, a silicone compound, an epoxy compound, a nano-cellulose, an inorganic compound or a combination thereof.

According to one embodiment of the present invention, the second film layer includes semi-crystalline polylactic acid, and the first film layer or the third film layer includes non-crystalline polylactic acid.

According to one embodiment of the present invention, the first film layer or the third film layer includes polyvinyl alcohol, polyvinyl chloride or polyvinylidene chloride.

According to one embodiment of the present invention, the second film layer has a thickness of 5 μm to 30 μm, and the first film layer and the third film layer each have a thickness of 0.1 μm to 10 μm.

Advantageous Effects

A biodegradable film according to one embodiment of the present invention is a biodegradable film having a three-layer structure that includes a film layer such as a heat-adhesive layer or a barrier coating layer with a biodegradable substrate layer including a biodegradable material as the center, and, by having excellent functionalities in a biodegradation rate, a heat shrink ratio, oxygen permeability, moisture permeability, airtightness, haze and the like, is capable of replacing an existing OPP film for cigarette packaging.

DESCRIPTION OF DRAWINGS

FIG. 1 is a diagram illustrating a schematic constitution of a biodegradable film for cigarette packaging according to one embodiment of the present invention.

BEST MODE

Hereinafter, embodiments will be described in detail through exemplary drawings. In adding reference numerals to constituents of each drawing, it needs to be noted that same constituents have same numerals as possible even when indicated in different drawings. In addition, in describing the embodiments, when it is decided that specific descriptions on related known constitutions or functions impede understanding of the embodiments, the detailed descriptions thereof will be omitted.

In addition, in describing a constituent of the embodiments, a term such as first, second, A, B, (a) or (b) may be used. Such a term is only used to distinguish the constituent from other constituents, and the nature, sequence, order or the like of the corresponding constituent is not limited by the term. When a certain constituent is described to be "linked", "joined" or "connected" to another constituent, the constituent may be directly linked or connected to the other constituent, but it needs to be understood that another constituent may also be "linked", "joined" or "connected" between each of the constituents.

A constituent included in any one embodiment and a constituent including common functions are described using the same name in other embodiments. Unless described to the contrary, descriptions provided in any one embodiment may also be applied to other embodiments, and specific descriptions will be omitted within the overlapping range.

The present invention relates to a biodegradable film for cigarette packaging, and more particularly, to a biodegradable film for seal packaging the outside of a paper packaging material directly containing a cigarette product. FIG. 1 provides a diagram illustrating a schematic constitution of a biodegradable film for cigarette packaging according to one embodiment of the present invention. As illustrated in FIG. 1, the biodegradable film according to one embodiment of the present invention includes a first film layer 10, a second film layer 20 and a third film layer 30. When packaging the cigarette product, the biodegradable film is divided into a surface facing the cigarette product and a surface exposed to the outside, and therefore, each film layer is separately expressed as a first film layer 10, a second film layer 20, a third film layer 30 and the like. When packaging the cigarette product, the first film layer 10 has one surface facing the cigarette product. Herein, the cigarette product may mean a state packed with a paper packaging material or the like. The third film layer 30 has one surface exposed to the outside when packaging a cigarette product. The second film layer 20 is positioned between the first film layer 10 and the third film layer 30. Between the first film layer 10 and the third film layer 30, one or more additional film layers may be applied as necessary in addition to the second film layer 20.

The biodegradable film according to one embodiment of the present invention has excellent functionalities enough to replace an existing OPP film. According to one embodiment of the present invention, the biodegradable film has a biodegradation rate of 90% or more after 60 days. The biodegradation rate adapts the ISO 14855-1 soil biodegradability measurement test standard, and the amount of carbon dioxide generated by biodegrading the film specimen under a controlled composting and aerobic condition is measured. Generally, it is considered a biodegradable material when decomposed by 90% or more compared to a reference material (cellulose). The biodegradable film is capable of exhibiting a high biodegradation rate even in a short period time of 60 days even though it is a film having a multilayer structure.

The biodegradable film according to one embodiment of the present invention has, while having high biodegradability, excellent barrier properties so as not to reduce quality of a cigarette product therein. Generally, biodegradable materials are often vulnerable to external environments such as moisture and air in order to have degradability at a certain level or more. Accordingly, a functional film layer or the like capable of blocking external environments such as moisture and air is required in order to manufacture a biodegradable film for cigarette packaging using a biodegradable material, and in the multilayer biodegradable film according to one embodiment of the present invention, such a functional film layer is included in other layers other than the film layer including a biodegradable material.

According to one embodiment of the present invention, the biodegradable film has oxygen permeability of 1000 cc/(m²·day·atm) or less. Specifically, the oxygen permeability may be 1000 cc/(m²·day·atm) or less, 900 cc/(m²·day·atm) or less, 800 cc/(m²·day·atm) or less, 700 cc/(m²·day·atm) or less, 600 cc/(m²·day·atm) or less, 500 cc/(m²·day·atm) or less, 400 cc/(m²·day·atm) or less, 300 cc/(m²·day·atm) or less, 200 cc/(m²·day·atm) or less, 100 cc/(m²·day·atm) or less or 50 cc/(m²·day·atm) or less. The oxygen permeability may be a value measured at 23° C. and 0 RH % using the method of ASTM D 3985 (Method M, Pressure Method), and for example, may be measured using a measuring device such as a gas transmission rate tester (OX-TRAN 702 product manufactured by Mocon, Inc. USA).

According to one embodiment of the present invention, the biodegradable film has moisture permeability of 50 g/(m²·day·atm) or less. Specifically, the moisture permeability may be 50 g/(m²·day·atm) or less, 45 g/(m²·day·atm) or less, 40 g/(m²·day·atm) or less, 35 g/(m²·day·atm) or less, 30 g/(m²·day·atm) or less, 25 g/(m²·day·atm) or less, 20 g/(m²·day·atm) or less, 15 g/(m²·day·atm) or less or 10 g/(m²·day·atm) or less. The moisture permeability may be a value measured at 38° C. and 100 RH %, and for example, may be measured using a measuring device such as a moisture permeability measuring device (PERMATRAN-W700 product manufactured by Mocon, Inc. USA).

According to one embodiment of the present invention, the biodegradable film has airtightness of 50 ml/sec or less. Specifically, the airtightness may be 50 ml/sec or less, 45 ml/sec or less, 40 ml/sec or less, 35 ml/sec or less, 30 ml/sec or less, 25 ml/sec or less, 20 ml/sec or less, 15 ml/sec or less or 10 ml/sec or less. The airtightness is measured using a device for measuring air leakage of a cigarette pack OPP film. The related airtightness measures a sealed state and a leaked state of the film using air pressure. This may be measured using a measuring device such as an airtightness measuring device (KARDIEN ALT-2 product manufactured by KARDIEN, Korea).

A machine packaging a film on a product such as a cigarette pack is a high-speed packaging machine capable of producing about 500 packs per minute. The film is generally supplied in a long fabric form (for example, roll form), and is cut to a required length to package the product. Even during such series of processes, the film needs to maintain the above-described biodegradability or functionalities relating to barrier properties, and in addition thereto, functionalities capable of maintaining excellent workability or productivity such as lowering packaging defects even in the high-speed packaging machine are required. In this regard, heat adhesion may be required so that the film to be applied favorably adheres to the product or heat shrinkage may be required so that the film may favorably adhere to the outer surface of the product without uneven surfaces even after the packaging. In addition, as described above, a friction coefficient that the film surface has may be important in a continuous packaging process proceeding at a high speed in order to manufacture a large amount of products without defects. The biodegradable film according to one embodiment of the present invention has high processability without product defects even in a high-speed packaging machine packaging products such as a cigarette pack.

In workability or processability of a product, heat shrinkage may also become an important factor. When a coating layer is added to a film fabric made of a biodegradable material in order to secure functionalities, heat shrinkage may be reduced. After packaging a cigarette pack or the like, adhering a film to a surface of the pack facilitates transportation and, in addition thereto, enhances aesthetics of the package appearance by reducing an uneven surface on the outer surface. Accordingly, a certain level or more of heat shrinkage is required as properties of a biodegradable film in order to increase adhesiveness of the film after packaging. According to one embodiment of the present disclosure, the biodegradable film has a heat shrink ratio of 4.0% or more, specifically 4.5% or more, and more specifically 5.0% or more. The heat shrink ratio adapts the KS M ISO 17555, and specifically, a test piece having a width of about 20 mm and a length of about 150 mm is prepared (same in MD and TD directions), and after placing marks at a distance of about 100 mm in the central part, the test piece is put in a hot air oven in which the temperature is maintained at 120° C. and heat treated for 15 minutes, and then the heat shrink ratio is calculated through the following Mathematical Formula 2 by measuring the length.

$$\text{Heat shrink ratio (\%)} = (L_i - L_t)/L_i \times 100 \qquad \text{[Mathematical Formula 2]}$$

In Mathematical Formula 2, Li means a distance between marks before heat treatment, and Lt means a distance between marks after heat treatment. The length considers both a length direction or machine direction (MD direction) when supplying a material and a width direction or a cross direction (CD direction) when supplying a material, and selects a lower value of the two. Since a lower value between the heat shrink ratios in a length direction and a width direction is considered, the biodegradable film according to one embodiment of the present disclosure is capable of securing a heat shrink ratio greater than or equal to the above-mentioned value in all directions. According to one embodiment of the present disclosure, the biodegradable film has a difference in the heat shrink ratio between the length direction and the width direction of less than 1%. The difference in the heat shrink ratio is calculated based on a larger value between the heat shrink ratios in the length direction and the width direction. Specifically, the difference in the heat shrink ratio may be less than 1%, less than 0.9%, less than 0.8%, less than 0.7%, less than 0.6% or less than 0.5%.

When the functionalities such as barrier properties, heat adhesion and kinetic friction coefficient described above are given to a biodegradable material, transparency of a film may be significantly reduced. Considering that information on a cigarette product is mainly displayed on a cigarette pack or the like, a biodegradable film used as a packaging material covering such a cigarette pack or the like is more useful as transparency is higher. According to one embodiment of the present invention, the biodegradable film has haze of 6.0% or less, specifically 5.5% or less, and more specifically 5.0% or less. The haze is measured using Haze gard-2 manufactured by Toyoseiki company. The biodegradable film according to one embodiment of the present invention has a low haze value and is thereby capable of securing transparency at a certain level or more, and by having excellent adhesion with a cigarette pack, visibility for an inner packaging target is high.

The biodegradable film according to one embodiment of the present invention having the above-described functionalities includes a first film layer, a second film layer and a third film layer. The first film layer, the second film layer and the third film layer are each a separate layer and are divided not only by position as described above, but also by constituents forming the film layer or compositions thereof. According to one embodiment of the present invention, the first film layer, the second film layer and the third film layer are each formed with different compositions, and at least one of the first film layer, the second film layer and the third film layer includes a biodegradable material. The film layer including the most of the biodegradable material may basically be a support film layer, and around the corresponding film layer, other film layers may be introduced through coating. Accordingly, in the present specification, the film layer including the most of the biodegradable material is also expressed as a biodegradable substrate layer.

As the biodegradable material, materials having a high biodegradation rate while having durability at a certain level or more when forming the film may be used, and largely, biodegradable biomass materials, biodegradable plastic materials and the like may be used. According to one embodiment of the present invention, the biodegradable material is selected from the group consisting of polylactic acid (PLA), polyhydroxyl alkanoate (PHA), starch, cellulose materials, polyvinyl alcohol (PVA), polycaprolactone (PCL), polybutylene adipate terephthalate (PBAT), polyethylene succinate (PES), polybutylene succinate (PBS), polyglycolic acid (PGA) and combinations thereof. Herein, the cellulose material may be cellulose, a cellulose derivative or regenerated cellulose. According to one embodiment of the present invention, the support film layer or the biodegradable substrate layer may include the biodegradable material of 70% by weight or more, specifically 80% by weight or more, and more specifically 90% by weight or more based on the total weight of the layer.

According to one embodiment of the present invention, the rest of the coating layers other than the support film layer or the biodegradable substrate layer include a polyvinyl compound, an ethylene vinyl alcohol copolymer (EVOH), an acrylic compound, a sealant compound, an OP coating compound, a urethane compound, a silicone compound, an epoxy compound, a nano-cellulose, an inorganic compound or a combination thereof in order to include a biodegradable material with different properties or to add additional functionalities. The materials supplement the lack of functionalities of the biodegradable substrate layer.

The biodegradable material introduced to the coating layer may have different properties from the support film layer or the biodegradable substrate layer. According to one embodiment of the present invention, the support film layer or the biodegradable substrate layer includes a semi-crystalline biodegradable polymer (for example, semi-crystalline polylactic acid), and the coating layer includes a non-crystalline biodegradable polymer (for example, non-crystalline polylactic acid). Herein, non-crystalline means that there is no regularity in the atomic arrangement between atoms forming the polymer material and semi-crystalline means that regularity in the atomic arrangement is present between some atoms forming the polymer material, and, in terms that it is difficult for a polymer material to have 100% crystallinity due to its nature, the biodegradable polymer that is not non-crystalline may be semi-crystalline.

Functionally, the materials may be largely divided into a heat-adhesive layer and a barrier coating layer. The biodegradable film according to one embodiment of the present invention includes a heat-adhesive layer and a barrier coating layer at the same time together with the biodegradable substrate layer. The biodegradable substrate layer, the heat-adhesive layer and the barrier coating layer may each be disposed as the first film layer, the second film layer and the third film layer without overlapping. Specifically, the second film layer may be the biodegradable substrate layer, and the first film layer or the third film layer may be the heat-adhesive layer or the barrier coating layer. More specifically, the first film layer may be the heat-adhesive layer, the second film layer may be the biodegradable substrate layer, and the third film layer may be the barrier coating layer. According to one embodiment of the present invention, the heat-adhesive layer or the barrier coating layer may also include a biodegradable material, but not in a larger amount than the biodegradable substrate layer.

The heat-adhesive layer includes a polyvinyl compound, an ethylene vinyl alcohol copolymer, an acrylic compound, a sealant compound, an OP coating compound or a combination thereof, and the barrier coating layer includes a polyvinyl compound, an ethylene vinyl alcohol copolymer, an acrylic compound, a urethane compound, a silicone compound, an epoxy compound, a nanocellulose, an inorganic compound or a combination thereof. When materials of the heat-adhesive layer or the barrier coating layer are used in combination, they may be mixed and used in one layer, or the layer is separated into two or more layers and each layer may be formed with a different composition. For example, when one layer of the barrier coating layer is formed by depositing an inorganic compound, additional barrier coating layers may be formed on the inorganic compound layer through the remaining materials. The compounds included in the heat-adhesive layer or the barrier coating layer are not particularly limited as long as they are materials generally usable in the art. Examples of the inorganic compound may include $Al_2O_3$, $SiO_2$, ZnO, $ZrO_2$, $BaTiO_3$, $TiO_2$, $Ta_2O_5$, $Ti_3O_5$, ITO, IZO, ATO, ZnO—Al, $Nb_2O_3$, SnO, MgO and the like, and the inorganic compound is not particularly limited as long as it is a material generally usable in the art.

The polyvinyl compound includes a compound in which the polyvinyl compound is substituted with a hydroxyl group or a halogen group. As the polyvinyl compound, compounds such as polyvinyl alcohol, polyvinyl chloride and polyvinylidene chloride may be included.

As the acrylic compound, an acrylic resin and the like may be used, and the acrylic compound is not particularly limited as long as it is a material generally usable in the art. The acrylic resin is a water-dispersible emulsion-type acrylic resin, and acrylic resins including at least one functional group selected from the group consisting of a hydroxyl group, a carboxyl group, an N-methylol group, an alkoxymethylol group, an acrylate group and an acryloyl group, and the like may be used. For example, the acrylic resin may be obtained by polymerizing a (meth)acrylic monomer alone, or may be obtained by copolymerizing a (meth)acrylic monomer with one or more types of copolymerizable monomers copolymerizable therewith.

Examples of the (meth)acrylic monomer may include methyl (meth)acrylate, ethyl (meth)acrylate, n-propyl (meth)acrylate, i-propyl (meth)acrylate, n-butyl (meth)acrylate, i-butyl (meth)acrylate, sec-butyl (meth)acrylate, t-butyl (meth)acrylate, 2-ethylhexyl (meth)acrylate, lauryl (meth) acrylate, tridecyl (meth)acrylate, stearyl (meth)acrylate, cyclohexyl (meth)acrylate, benzyl (meth)acrylate, tetrahydrofurfuryl (meth)acrylate, 2-hydroxyethyl (meth)acrylate, 2-hydroxypropyl (meth)acrylate, 2-methoxyethyl (meth) acrylate, 2-ethoxyethyl (meth)acrylate, 2-butoxyethyl (meth)acrylate, 2-phenoxyethyl (meth)acrylate, allyl (meth) acrylate, glycidyl (meth)acrylate, dimethylaminoethyl (meth)acrylate and the like, and these may be used either alone or as a mixture of two or more types thereof.

Examples of the copolymerizable monomer may include carboxyl group-containing ethylenically unsaturated monomers such as (meth)acrylic acid, crotonic acid, itaconic acid, maleic acid and fumaric acid; vinyl monomers such as acrylamide, acrylonitrile, vinyl acetate, ethylene, propylene, isobutylene, butadiene, isoprene and chloroprene; epoxy group-containing ethylenically unsaturated monomers such as glycidyl (meth)acrylate, methyl glycidyl (meth)acrylate, allyl glycidyl ether and 3,4-epoxycyclohexylmethyl (meth) acrylate; and hydroxyl group-containing ethylenically unsaturated monomers such as hydroxyethyl methacrylate and 2-hydroxypropyl methacrylate, and the like, and these may be used either alone or as a mixture of two or more types thereof. According to one embodiment of the present invention, carboxyl group-containing ethylenically unsaturated monomers such as (meth)acrylic acid, crotonic acid, itaconic acid, maleic acid and fumaric acid may be used as the copolymerizable monomer.

The above-described compounds included in the heat-adhesive layer or the barrier coating layer may be included in a proper amount in order to obtain target functionalities of each film layer. According to one embodiment of the present invention, the constituents may be included in 20% by weight to 70% by weight in the film layer including the same.

The biodegradable film may be adjusted to have a thickness proper to be used for cigarette packaging while securing the above-described functionalities. According to one embodiment of the present invention, the biodegradable film has a thickness of 10 μm to 50 μm. Specifically, the biodegradable film thickness may be 10 μm or more, 11 μm or more, 12 μm or more, 13 μm or more, 14 μm or more or 15 μm or more, and 50 μm or less, 45 μm or less, 40 μm or less, 35 μm or less, 30 μm or less or 25 μm or less. Each of the film layers may have the thickness adjusted as follows depending on the biodegradable substrate layer, the heat-adhesive layer or the barrier coating layer. According to one embodiment of the present invention, the biodegradable substrate layer has a thickness of 5 μm to 30 μm, 10 μm to 30 μm or 15 μm to 25 μm, and the remaining coating layers other than the biodegradable substrate layer have a thickness of 0.1 μm to 10 μm, 0.3 μm to 5 μm or 0.5 μm to 2 μm.

According to one embodiment of the present invention, the support film layer or the biodegradable substrate layer may be included in the biodegradable film in 80% by volume or more, 85% by volume or more, or 90% by volume or more. Each of the film layers has almost the same area, and the volume ratio may be proportional to the thickness ratio of each of the film layers. When there are two remaining coating layers other than the biodegradable substrate layer, each of the remaining coating layers may occupy 10% by volume or less, 9% by volume or less, 8% by volume or less, 7% by volume or less, 6% by volume or less or 5% by volume or less in the biodegradable film.

According to one embodiment of the present invention, the support film layer or the biodegradable substrate layer is the second film layer. By employing the second film layer positioned at the center in the biodegradable film as the biodegradable substrate layer, the ratio of the biodegradable substrate layer may increase. According to one embodiment of the present invention, the second film layer is included in 80% by volume or more in the biodegradable film. According to one embodiment of the present invention, the first film layer or the third film layer includes a biodegradable material having different properties from the second film layer. According to one embodiment of the present invention, the first film layer or the third film layer includes a polyvinyl compound, an ethylene vinyl alcohol copolymer, an acrylic compound, a sealant compound, an OP coating compound, a urethane compound, a silicone compound, an epoxy compound, a nano-cellulose, an inorganic compound or a combination thereof. According to one embodiment of the present invention, the second film layer includes semi-crystalline polylactic acid, and the first film layer or the third film layer includes non-crystalline polylactic acid. According to one embodiment of the present invention, the first film layer or the third film layer includes polyvinyl alcohol, polyvinyl chloride or polyvinylidene chloride. According to one embodiment of the present invention, the first film layer includes non-crystalline polylactic acid, and the third film layer includes polyvinyl alcohol, polyvinyl chloride or polyvinylidene chloride. In one embodiment of the present invention, the second film layer has a thickness of 5 μm to 30 μm, and the first film layer and the third film layer each have a thickness of 0.1 μm to 10 μm.

Hereinafter, constitutions of the present invention and effects obtained therefrom will be described in more detail through the examples and the comparative examples. However, the examples are for more specifically describing the present invention, and the scope of the present invention is not limited to these examples.

EXAMPLE

Example 1

As a second film layer, a semi-crystalline polylactic acid film (TE90C product manufactured by SKC Corporation)

having a thickness of about 21 μm was prepared. In order to form a first film layer on the second film layer applied such that one surface thereof faces a cigarette product, non-crystalline polylactic acid (product manufactured by SKC Corporation) having a thickness of about 1 μm was coated on the second film layer. In order to form a third film layer on the second film layer applied such that one surface thereof is exposed to the outside, polyvinylidene chloride (product manufactured by YoulChon company) having a thickness of about 1 μm was coated on the other surface of the second film layer on which the first film layer was not coated. The prepared three-layer biodegradable film was used for packaging a cigarette product in a packaging machine for cigarette packaging using a method of heat seal. The biodegradable film secured functionalities as a biodegradable film by including the polylactic acid film having a high biodegradation rate in about 90% by volume or more.

Comparative Example 1

A two-layer biodegradable film was prepared in the same manner as in Example 1, except that the first film layer was not coated on the second film layer, and as the third film layer, non-crystalline polylactic acid (product manufactured by SKC Corporation) having a thickness of about 1 μm was coated.

Comparative Example 2

A three-layer biodegradable film was prepared in the same manner as in Example 1, except that, as the third film layer, an OP coating compound (ECOBY-OPP product manufactured by YoulChon company) having a thickness of about 1 μm was coated.

Experimental Example

In order to evaluate whether the biodegradable films prepared in Example 1 and Comparative Examples 1 and 2 have properties suitable for cigarette packaging, a heat shrink ratio, oxygen permeability, moisture permeability, airtightness and haze were measured, and the results are shown in Table 1 below. The method for measuring each property basically followed a general method used in the art, and specifically, the properties were measured using the methods specified in the descriptions provided above.

TABLE 1

|  | Example 1 | Comparative Example 1 | Comparative Example 2 |
|---|---|---|---|
| Heat Shrink Ratio | 5.2 | 6.2 | 4.4 |
| Difference in Heat Shrink Ratio (%) | 0.1 | 2.6 | 1.1 |
| Oxygen Permeability (cc/(m$^2$ · day · atm)) | 0.26 | 1000 | 1.44 |
| Moisture Permeability (g/(m$^2$ · day · atm)) | 3.79 | 385.1 | 355.1 |
| Airtightness (ml/sec) | 0 | 78 | 130 |
| Haze (%) | 3.9 | 2.1 | 22.5 |

* The heat shrink ratio selects a lower numerical value between the heat shrink ratios in the length direction and the width direction, and the difference in the heat shrink ratio is a value obtained by subtracting the lower numerical value from the higher numerical value between the heat shrink ratios in a length direction and a width direction.

According to Table 1, it was identified that, even when filling the second film layer with the biodegradable film of about 90% by volume or more, a biodegradable film having suitable properties as in Example 1 was able to be prepared in packaging a cigarette product by introducing the first film layer and the third film layer using proper materials. In addition, it may be difficult to achieve the biodegradable film having such properties without any one of the first film layer and the third film layer as in Comparative Example 1, and it may also be difficult to achieve the biodegradable film having such properties even when coating a coating material well-known in the field of coating as in Comparative Example 2.

Hereinbefore, embodiments have been described by limited embodiments and drawings, however, various modifications and changes may be made by those skilled in the art from the descriptions provided above. For example, proper results may be achieved even when the described techniques are performed in an order different from the described methods, and/or the described constituents such as systems, structures, devices and circuits are joined or combined in a form different from the described methods, or replaced or substituted by other constituents or equivalents.

REFERENCE NUMERAL

100: Biodegradable Film for Cigarette Packaging
10: First Film Layer
20: Second Film Layer
30: Third Film Layer
The invention claimed is:

1. A biodegradable film for cigarette packaging, the film comprising:
a first film layer applied such that one surface thereof faces a cigarette product;
a third film layer applied such that one surface thereof is exposed to the outside; and
a second film layer positioned between the first film layer and the third film layer,
wherein the first film layer, the second film layer and the third film layer are each formed with different compositions, and at least one of the first film layer, the second film layer and the third film layer comprises a biodegradable material;

the first film layer comprises non-crystalline polylactic acid, the second film layer comprises a semi-crystalline biodegradable polymer, and the third film layer comprises polyvinyl chloride or polyvinylidene chloride,
the second film layer is 90% by volume or more of the biodegradable film, and
the biodegradable film has a biodegradation rate of 90% or more after 60 days, and has a heat shrink ratio of 4.0% or more.

2. The biodegradable film of claim 1, which has a difference in the heat shrink ratio between a length direction and a width direction of less than 1%.

3. The biodegradable film of claim 1, which has oxygen permeability of 1000 cc/(m$^2$·day·atm) or less.

4. The biodegradable film of claim 1, which has moisture permeability of 50 g/(m$^2$·day·atm) or less.

5. The biodegradable film of claim 1, which has airtightness of 50 ml/sec or less.

6. The biodegradable film of claim 1, which has haze of 6.0% or less.

7. The biodegradable film of claim 1, wherein the semi-crystalline biodegradable polymer is selected from the group consisting of polylactic acid, polyhydroxyl alkanoate, starch, cellulose materials, polyvinyl alcohol, polycaprolactone, polybutylene adipate terephthalate, polyethylene succinate, polybutylene succinate, polyglycolic acid and combinations thereof.

8. The biodegradable film of claim 1, wherein the second film layer comprises a semi-crystalline biodegradable polymer having different properties from the second film layer or the third film layer.

9. The biodegradable film of claim 1, wherein the second film layer comprises semi-crystalline polylactic acid.

10. The biodegradable film of claim 1, wherein the second film layer has a thickness of 5 μm to 30 μm, and the first film layer and the third film layer each have a thickness of 0.1 μm to 10 μm.

* * * * *